United States Patent [19]

Talati

[11] Patent Number: 5,390,330
[45] Date of Patent: Feb. 14, 1995

[54] CONTROL SYSTEM AND METHOD FOR DIRECT EXECUTION OF SOFTWARE APPLICATION INFORMATION MODELS WITHOUT CODE GENERATION

[76] Inventor: Kirit K. Talati, 207 Sun Ray La., Sunnyvale, Tex. 75102

[21] Appl. No.: 16,430

[22] Filed: Feb. 11, 1993

[51] Int. Cl.[6] .............................................. G06F 15/00
[52] U.S. Cl. ................................... 395/700; 364/488; 364/578; 364/274.4; 364/275.6; 364/DIG. 1
[58] Field of Search ................ 395/600, 700; 364/488, 364/578

[56] References Cited

U.S. PATENT DOCUMENTS

| | | | |
|---|---|---|---|
| 4,656,603 | 4/1987 | Dunn | 395/1 |
| 5,047,918 | 9/1991 | Schwartz et al. | 395/600 |
| 5,193,182 | 3/1993 | Bachman et al. | 395/600 |
| 5,212,650 | 5/1993 | Hooper et al. | 364/489 |
| 5,235,701 | 8/1993 | Ohler et al. | 395/600 |
| 5,249,300 | 9/1993 | Bachman et al. | 395/800 |
| 5,267,175 | 11/1993 | Hooper | 364/489 |
| 5,307,499 | 4/1994 | Yin | 395/700 |

*Primary Examiner*—Thomas G. Black
*Assistant Examiner*—Paul Harrity
*Attorney, Agent, or Firm*—David H. Judson

[57] ABSTRACT

A model information control system ("MICS") is used in conjunction with a user-defined information model and one or more conventional information system program modules or "functions" to execute business applications. The MICS includes an event-action-state machine that manipulates the user-defined information model and the functions.

5 Claims, 2 Drawing Sheets

CONTROL SYSTEM AND METHOD FOR DIRECT EXECUTION OF SOFTWARE APPLICATION INFORMATION MODELS WITHOUT CODE GENERATION

TECHNICAL FIELD

The present invention relates to computer systems and more particularly to information engineering technology for creating, executing and maintaining information systems using a model information control system.

BACKGROUND OF THE INVENTION

Information system developers are facing a much different competitive environment than in the recent past. Over the past several years, the emphasis has changed from data processing to management of information systems to decision support systems to strategic information systems. In order to keep up with changes in business, information developers must build systems which are flexible enough to adopt changes in business functions without at the same time incurring excessive maintenance and related costs.

Over the last twenty years or so, software development automation has progressed along three distinct and separate paths. One path pursued increased programming efficiency by automating program coding activities. The result was the development of non-procedural interpretive languages such as fourth generation languages (4GL) and program generators. The second path sought to achieve design effectiveness by bringing structure and rigor to analysis and design. The second path resulted in the development of structured methods of flowcharting programs or dividing programs into functional modules. More recently, automation of such structured methods has been achieved through computer aided software engineering ("CASE") graphic diagraming tools. The third path focused on reusability by taking a database approach to development using objects and data abstraction. This approach initially used a construct known as a data dictionary for accessing information about the data and the relationships among data elements. More recently, such techniques have comprised object-oriented systems and have incorporated so-called information resources dictionaries for storing and accessing objects, programs and data.

Because each of these paths and approaches has merits, there have been attempts made to integrate all of the different tools of the three different paths under the umbrella of information engineering. For example, there is an evolving ANSI standard for repository technology, and IBM has set forth "AD/Cycle," which defines methods to manage all information resources including application specification, programming tools, software programs, software program codes and data.

These approaches, however, do not resolve the problem of application program maintenance. Maintenance and other related support of computer software applications is often expensive, time consuming and unreliable. In order to eliminate maintenance cost, essentially one needs to eliminate application programs themselves. This would have the attendant benefit of reducing the information engineering application development cycle of specification, design, implementation and execution. Neither the three application development paths nor the integrated approaches described above adequately address the maintenance problem or how to solve it.

There is therefore a need for radically different approaches and techniques for developing "maintenance free" application software programs.

BRIEF SUMMARY OF THE INVENTION

It is thus a primary object of the present invention to provide an information model control system for implementing business applications using simple object-oriented information models as opposed to conventional source code or other high level programming tools such as 4GL or CASE to automate application program implementation. According to the invention, there is thus no "programming," automated or otherwise, in the sense of the prior art because the application developer need only write an information model to implement an application. Modification or maintenance of the "application" requires only a rewrite of the information model, and therefore use of the present invention obviates conventional software maintenance involving debugging, source code rewriting and testing either using traditional programming languages or tools such as 4GL or CASE technology.

It is thus another important object of the invention to provide systems and methods that eliminate the large maintenance costs associated with traditional application software programs.

It is still a more specific object of the invention to provide a method of emulating application processing logic and control using object oriented information models. The normal application development cycle, namely, specification, design, implementation and execution, is thereby replaced by mere specification and execution of information models.

It is a more specific object of the present invention to provide a model information control system that uses developed information models, and one or more functions or function service interfaces (such as a user interface and a database interface) to implement business applications defined in the information models.

It is still another object of the invention to provide a single interface for building information specifications and user documentation, and for execution of application software via information models as opposed to creating, executing and maintaining application software programs and documentation.

It is yet another object of the invention to provide a model information control system that extends existing client-server computing techniques using information model computing. The invention automates client-server computing of application programs using an information model and the server portion of the client-server methodology.

In the preferred embodiment, a model information control system ("MICS") is used in conjunction with a user-defined information model and one or more conventional information system program modules or "functions" or function service interfaces to execute a business application defined by the information model. The MICS includes the information models and a control system engine (CSE) comprising an state-action-event machine that controls processing of information associated with control flags in the user-defined information model. The control flags associated with information facilitate the execution of the information model by the CSE, thus emulating the conventional execution of an application software program in present computer systems.

According to a more specific aspect of the invention, a model information control system is provided for use in conjunction with a target computer having one or more functions or function service interfaces such as a user interface and a database interface. The MICS comprises at least one information model and a control system engine (CSE). The information model comprises at least one object and a dictionary of attributes. The object generally will include a set of attributes that is a "subset" of the attributes in the dictionary, as well as a number of control flags. Attributes and objects in the information model use consistent rules or "expressions" that, in conjunction with the various control flags, facilitate the application process flow. The attributes of an object contain (i) information on how to assign values to these attributes, (ii) value constraints limiting the kind of values that can be assigned to these attributes, and (iii) dependency information specifying how assigning a particular value to one attribute affects the value of another attribute.

More specifically, at the attribute level the attribute type control flags provide information identifying attribute type, and the attributes' relationship to other attributes, as well as providing specific function control directives for processing an instant of the object. The rules include "initial value" expressions that assign initial values to an attribute before initial instantiation thereof, "default value" expressions that assign default values to an attribute in the absence of a value being assigned, "values," "condition" or "assignment" expressions limiting the kind of values that can be assigned to an attribute, and "propagation" expressions specifying how assigning a particular value to one attribute affects the value of another attribute.

At the object level, the control flags provide information identifying object type, an object's relationship to other objects, and the identification of a set of actions that can be processed for the object. The "rules" at the object level include "initial values" expressions that serve to modify attribute default values, "values," "condition" or "assignment" constraint expressions limiting the kind of values attributes can have for an instant that can be activated for the object, and "propagation" expressions specifying how the change of values of one attribute by activation or action affects the value of another attribute. When used in an object, these expressions modify the behavior of the instant of the object to effect the activation, instantiation and processing of information. For example, a constraint expression at the object level specifies the activation constraint limiting what kind of instants of the object can be activated. Finally, the object also includes index attributes by which instances of an object can be stored and retrieved via a database using the value of one or more attributes of the object.

Control flags are also used at the user "action" level. At the "action" level within the CSE, control flags and functions associated with an action provide process flow for activation and processing of information through one or more functions to perform a specific action.

The control system engine means reads the information model directly and in response thereto (i) activates objects from the set of objects defined in the information model, (ii) activates actions from a set of actions associated with action control flags of an object, (iii) activates one or more "instants" of an object and (iv) processes the one or more instants of the object through one or more interfaces or functions associated with the actions along with any expressions associated with the object and/or its attributes.

The MICS extends the information model with control flags to create the application process flow necessary to execute applications using the CSE, which operates on all information models in a consistent manner. Therefore, application program logic and control is automated by defining application programs in terms of models and then processing application programs directly from the models. This approach eliminates traditional maintenance of application programs. Since the information model contains function specific control directives and rules, one can easily map such information to user documentation, thus further eliminating creation and maintenance of user documentation. This is preferably accomplished via "descriptions" of attributes, objects and/or models. Therefore, since the information model facilitates application process flow of the application and further contains such "descriptions," one can map the model to user documentation on how to use the application system. This also eliminates the complex task of creating documentation using specification and application process flow.

The foregoing has outlined some of the more pertinent objects of the present invention. These objects should be construed to be merely illustrative of some of the more prominent features and applications of the invention. Many other beneficial results can be attained by applying the disclosed invention in a different manner or modifying the invention as will be described. Accordingly, other objects and a fuller understanding of the invention may be had by referring to the following Detailed Description of the preferred embodiment.

BRIEF DESCRIPTION OF THE DRAWINGS

For a more complete understanding of the present invention and the advantages thereof, reference should be made to the following Detailed Description taken in connection with the accompanying drawings in which.

DETAILED DESCRIPTION

Figure 1:
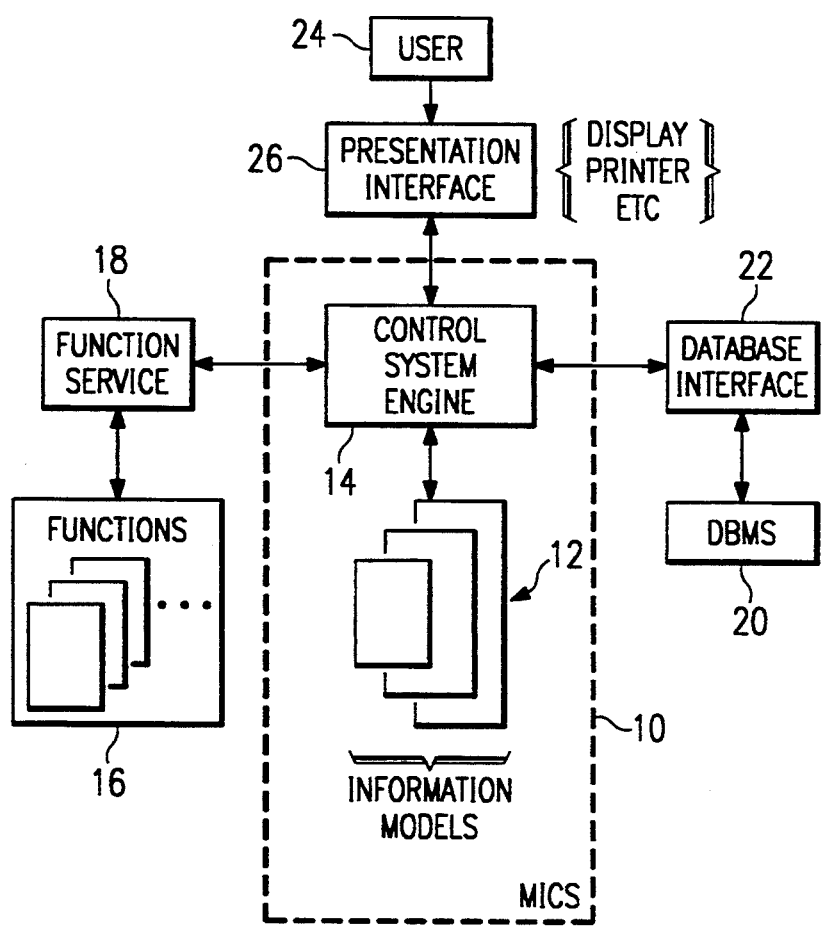
FIG. 1 is a block diagram of the model information control system of the present invention.

Referring now to FIG. 1, a block diagram is shown of the preferred embodiment of the model information control system (MICS) 10 of the present invention. The MICS 10 includes at least one information model 12 which is created using a text editor and specific semantic rules defined for a target computer system upon which the MICS executes. Several information models are shown in detail below. The target computer system typically comprises a 486-based computer running a UNIX, DOS or OS/2 operating system of the like, although other target systems are useful as well. The MICS also includes a control system engine (CSE) 14 which is preferably a finite state control action machine that cycles through states of operation as will be described in more detail below. The control system engine 14 performs several actions. It activates an object from a set of objects defined in the information model 12. The control system engine 14 also activates an action from a set of actions 16 associated with the object. This is achieved using an associating action flag as will be described.

The control system engine 14 also activates "instants" of the object based on activation constraints of the attributes of the object, and the CSE processes each instant through a function set associated with the action. An "instant" of an object refers to a given condition or state of the values of the object's attributes. An "active" instant of an object exists where the object's attributes have values assigned or instantiated previously by retrieving the values from the database. An "empty" instant is a condition where the values of the object's attributes have yet to assigned or instantiated. Data used by the control system engine is stored in a database (DB) 20 and the engine interacts with the DB 20 through a database interface 22. The user 24 of the MICS interfaces to the rest of the system through a presentation interface 26. Although not shown in detail, it should be appreciated that one or more functions and/or the database may be accessed locally or remotely.

The information model comprises at least one object and a dictionary of attributes. The object generally will include a set of attributes that is a "subset" of the attributes in the dictionary, a number of control flags, and one or more rules or expressions. The control flags, in conjunction with the expressions, facilitate the CSE's use of the object. Preferably, control flags are divided into four distinct types, namely (1) attribute type flags, (2) object type flags that control storage and retrieval of the object's instant(s), (3) action type flags that facilitate activation and processing of instant(s) through one or more functions, and (4) function control flags used with attributes to provide control of attributes specific to the function, e.g., presentation function control flags that can be passed to a user interface function to control the presentation and/or interactions between the user interface function and the various I/O devices of the system (such as the presentation display and report printer).

The attribute type control flags include flags which are numbers or letters identifying "storage" classes such as "real," "integer," "scientific," "boolean," "ACSII," "data," "time" and the like. So, for example, the attribute PATIENT NAME has three attribute control flats: "c" "0" "30." The first flag indicates that the data is the ASCII character format. The "0" indicates there is no associated presentation format. The last flag indicates the length of the ACSII data storage class.

The object type control flags include "primitive," "transient," "atomic," "view," "synonym," "link," "table" and "group." This list is exemplary and other object type flags can be defined and used to categorize and associate one object with one or more other objects. A primitive object type flag indicates that the object's instant(s) are to remain in the MICS in the system for some time. A transient object type flag indicates that the object's instants need only be retained in the system for the duration of processing of particular actions. An atomic object type flag means that the object's instant is derived by abstraction from some other (primitive) instant of the object. An instant identified by a transient object type flag is also retained in the system. A view object type flag indicates that the primary object is a view of some other object. A "synonym" object type flag follows an identification of a primary object and indicates that the attributes of the primary object should be substituted with the attributes of the object identified in a "using of" flag. Thus, if an object A is followed by the flag "using of X," the attributes of object X would be used by object A.

A "group" object type control flag indicates that a set of instants must be processed in a group by a selected action. Each object may also have an associated link object. For example, if object A is an atomic view of a primitive object B, then object B is said to be the associated link object of object A. Or, if the instant of object C can exist if and only if there is a corresponding instant of an another object D, then object D is said to be an associated link object of object C.

As noted above, the action type flags in the object identify the action which facilitates activation and processing of instant(s) by the CSE. An action consists of four control flags, namely "action identifier," "instant type," "action class," "instant propagation type," and optionally one or more "function." An action identifier flag is the flag by which the particular action is known external to the system. The instant type flag indicates the type of instant (active or empty). The action class flag identifies which class of actions the particular action belongs. An instant propagation type flag indicates how to propagate the change of instant for a primitive or atomic object of the instant. The functions if defined may be required to be executed to process the instant.

The functions are included in the MICS system using a compiler and link/editor or other conventional means. Such functions may be "off-the-shelf" modules or actually written into the MICS if desired. However, once the function set is defined, it is not necessary to maintain the function set code in any traditional sense.

As noted above, when the object is defined in the information model, it will typically include presentation control function flags that control presentation of the object's attributes by external interfaces. In particular, each attribute therein may include one or more of the presentation control flags which can be passed to the user interface function to control the presentation and/or interactions between the user interface function and the various I/O devices of the system (such as the presentation display and report printer). Representative sample of presentation control flags are FPROT, MFILL, RJUST, FHIDE, DPROT, RSKIP, CENTER, GROUP, WSKIP and PHIDE. An FPROT presentation control flag provides a field protection action that prevents the user from instantiating the particular attribute of the object. An MFILL flag indicates that the attribute is one that the user must instantiate. The RJUST, LJUST, or CENTER flags inform the presentation interface to right justify, left justify, or center value of the attribute to the presentation display. An FHIDE flag prevents the value of the from being displayed. A DPROT flag protects the value of the attribute from being overwritten. An RSKIP flag tells the presentation interface to skip the attribute when a report is printed, and an WSKIP flag tells the interface to skip the attribute when a window is created on the display. PHIDE flag hides the name of the attribute. GROUP flag indicates that the interface should organize values of attributes for a display so it is easy to read. For example, a patient list can be grouped by city, state, and zipcode, and a financial report could be grouped by day, week and month. The object may include other presentation control flags for similar control purposes.

According to a feature of the invention, attributes and objects in the information model use consistent rules or "expressions" that, in conjunction with the various control flags, facilitate the application process flow to execute information model. The attributes of an object contain (i) information on how to assign values to these attributes, (ii) value constraints limiting the kind of values that can be assigned to these attributes, and (iii) dependency information specifying how assigning a particular value to one attribute affects the value of another attribute. More specifically, at the attribute level these rules include (i) "initial values" or "default values" expressions that assign values to these attributes, (ii) "values," "condition" or "assignment" expressions limiting the kind of values that can be assigned to these attributes, and (iii) "propagation" expressions specifying how assigning a particular value to one attribute affects the value of another attribute. Similar rules or expressions are implemented at the object level. When used in an object, these expressions modify the behavior of the instant of the object to effect the activation, instantiation and processing of information. For example, a contraint expression at the object level specifies the activation contraint limiting what kind of instants of the object can be activated. Finally, the object also includes index attributes by which instances of an object can be stored and retrieved via the database using the value of one or more attributes of the object.

Thus according to the invention, an object generally includes one or more control flags that facilitate the CSE's use of the object, a subset of attributes selected from a dictionary of attributes, and one or more rules or expressions that modify the behavior of an object's instants to affect the activation, instantiation and processing of information. An object's attributes may also include expressions that control how to assign values to these attributes, that limit the kind of values that can be assigned to these attributes, and that specify how assigning a particular value to one attribute affects the value of another attribute.

An advantageous feature of the present invention is that the MICS emulates application processing with autonomous control by directly converting one or more information models into an independent set of activation, instantiation and processing of functions using control flags defined in the model, thereby automating the application process flow of an application program. In the prior art, it has heretofore been necessary to create a detailed design of such process flow (and to automatically or manually generate source code to implement the flow). The present invention wholly obviates such detailed design and code generation.

According to the preferred embodiment of the invention, the MICS includes one or more information models and the control system engine (CSE). The control system engine reads the information model directly and in response thereto (i) activates objects from the set of objects defined in the information model, (ii) activates actions from a set of actions associated with action control flags of an object, (iii) activates one or more "instants" of an object and (iv) processes the one or more instants of the object through one or more interfaces or functions associated with the actions along with any expressions associated with the object and/or its attributes. In this manner, the MICS activates and processes the independent set of activation, instantiation and service actions over the information models.

A specific implementation of the MICS incorporating the features of the present invention can now be described. By way of additional background, it is helpful to define the concept of an "action" which refers to the automatic categorization and association of functions using control flags to control activation, instantiation and processing of information using one or more functions. This obviates the specific creation of process flow instructions for each application. Applications thus can be said to be isolated from the process flow specification process because the information model only needs to specify an action and not how the action is implemented. An "action" is preferably categorized by its class of service or type of function that it uses. For convenience, action class types are divided as follows:

1) ANALYSIS type (actions that process an active instants through one or more functions that analyze information);
2) DATABASE type (actions that process an active instant through one or more functions that access and manipulate information);
3) REPORT type (actions that process an active instant through one or more functions that create reports from information);
4) ADD type (actions that process an empty instant through one or more functions to create an active instant);
5) UPDATE type (actions that process an active instant through one or more functions that access, manipulate and return an active instant to the database);
6) DELETE type (actions that process an active instant through one or more functions that remove the trace of an instant from the database); and
7) CREATE type (actions that process an active instant through one or more functions to create atomic information from primitive information).

The above list of action types is merely exemplary and the MICS may include other action types or variations of the above. Each action has associated therewith the set of action control flags previously described. It should be noted that different sets of action control flags can be used instead of the flags identified above.

In an exemplary embodiment of the invention, for instance, assume that the action type is UPDATE. The associated action control flags are then: "UPDATE, ACTIVE INSTANT, DATABASE, UPDATE INSTANT, USR_INSTANTIATION." The first flag UPDATE is the identifier flag that identifies the action UPDATE. The second flag ACTIVE INSTANT indicates that the action requires an active instant. The third flag DATABASE identifies that the UPDATE action belongs to the DATABASE action class type. The fourth flag, UPDATE INSTANT, is the instant propagation type that will cause the CSE to update the final state of the active instant using the database interface. Finally, the function USR_INSTANTIATION indicates that the CSE will require the execution of a user instantiation function. The user instantiation function instantiates an instant through the user interface.

In another example, assume the action is ADD. The ADD action has action control flags "ADD, EMPTY INSTANT, DATABASE, UPDATE INSTANT, USR_INSTANTIATION," The first flag identifies the action ADD. The second flag indicates that the action operates on an empty instant. The third flag identifies that the ADD action belongs to the DATABASE action class type. The fourth flag, UPDATE INSTANT, is the instant propagation type flag and will cause the CSE to add a newly created instant to the database using the database interface. Finally, the function USR_INSTANTIATION indicates that CSE will require execution of a user instantiation function.

With the above background, the following is a portion of a representative object from an information model (shown below) for a medical office accounting, billing and patient management system:

OBJECT PATIENT CHART,primitive,ADD,UPDATE
ACNT NO,GROUP=100,PROTECT,FPROT
FIRST,GROUP=100,FPROT
LAST,GROUP=100,FPROT
RELEASE BILL?,GROUP=100,FPROT
PATIENT NAME,GROUP=101,MFILL
ADDRESS,GROUP=102,MFILL
CITY,GROUP=104,MFILL
STATE,GROUP=104,MFILL
ZIP CODE,GROUP=104,MFILL
BIRTHDATE,GROUP=105,MFILL
SEX,GROUP=105,MFILL
MARITAL STATUS,GROUP=105,MFILL
PHONE NO(HOME),GROUP-106,RJUST
(OFFICE),GROUP=106,RJUST
SOCIAL SEC.#,GROUP=107 . . .

The first field in the first line includes the object's name (in this case PATIENT CHART). The second field in the line includes the object type flag identifying the type of object (in this case primitive). Following the object type flag, the next field identifies the action type flags that identify the one or more actions that the CSE can select for activation, instantiation and processing of instant(s) of an object. In this example, the PATIENT CHART object includes an ADD action and an UPDATE action type flag. As shown above, the ADD and UPDATE actions comprise action control flags which the CSE uses to activate, instantiate and process the instant(s) of the object. An object having the DATABASE action class flag merely indicates to the CSE to substitute all actions associated with the DATABASE action class as available actions (thus making it unnecessary to individually list each action of the set).

Following the object type and action type control flags on the first line of the object, the object includes a set of attributes for the object which are selected from the "dictionary" of attributes defined in the information model. As can be seen, the patient chart object is used for accounting and information purposes and thus includes such attributes as name, address, date of last visit and account number, as well as others. The object further includes a number of presentation control flags that are associated with particular attributes. As noted above, the GROUP flags in the attributes are used to group different attributes of the object on the same line of the interface display. Thus ACNT NO, FIRST VISIT, LAST and RELEASE BILL attributes will be presented on the same line. An attribute will also include a DATA statement if the same attribute is used more than once in the object.

Figure 2:
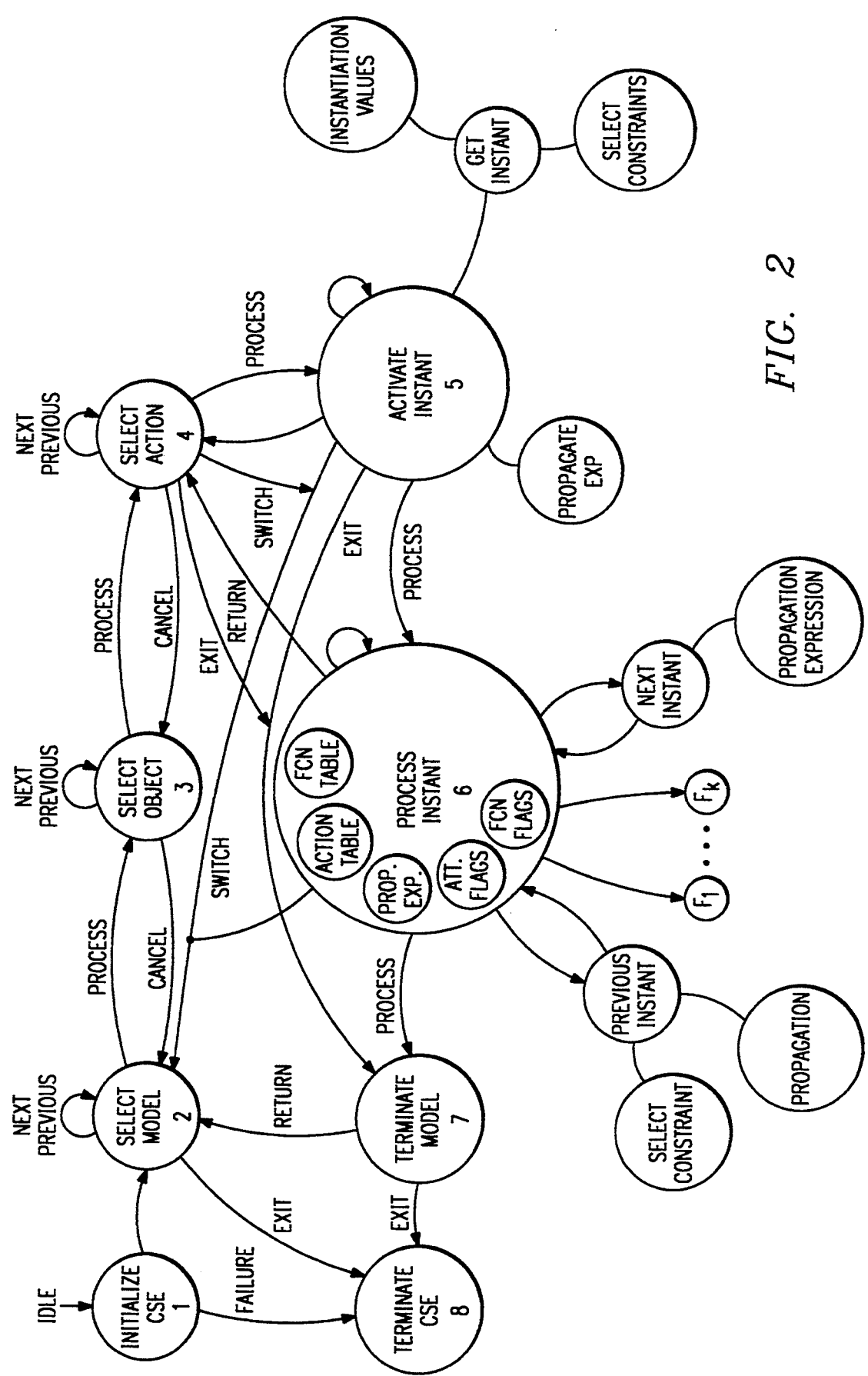
FIG. 2 is a detailed state diagram of the control system engine of the model information control system of FIG. 1.

Referring now to FIG. 2, a detailed state diagram is shown of the preferred operation of the control system engine (CSE) of the MICS. The various states of the CSE and associated control actions are identified below:

(1) Initialize MICS
(2) Select Model
(3) Select Object
(4) Select Action
(5) Activate Instant
(6) Process Instant
(7) Terminate Model
(8) Terminate CSE Prior to the CSE execution, one or more information models are created by a developer using semantic rules for the target system. Each information model has one of three states: idle, active and suspended. When an information model is in its idle state, its "next state" is active. An information model in the active state can be suspended at any time during the processing of the information model. Once suspended, the information model can be returned to its active state (at the same point therein where processing was suspended) or the suspended information model can be placed back into its idle state. Each information model has associated therewith a attribute identifying its state and its next state. Execution of the control system engine begins with State 1. In state 1, the CSE is initialized. This step obtains the necessary resources (e.g., memory, buffer pools, interprocess communication environment, I/O interface environment) from the operating system and then reads the action table definitions and function table definitions and loads them into memory. The CSE also creates structure in the memory to hold the information models, and loads information models into the memory. State 1 also sets up the user environment's presentation interface 26.

In State 1, all information models are set to idle and the information model attribute is set to "3" (which is the next state after selection of an idle model). The CSE then moves to State 2. If there is a failure during State 1, the CSE goes to State 8 and terminates, providing an error message or the like.

In State 2, the user is prompted to select an information model. Although not meant to be limiting, preferably the presentation interface is a Windows-based graphical user interface (GUI) and a conventional point and click device is used to make appropriate selections. If the user selects a model, the CSE sets an "active model" attribute to the selected model. If the user decides to cancel the session, the CSE activates the most recently suspended model to "active model." The CSE then proceeds to the next state of the active model. If the user decides to exit, the CSE proceeds to State 8 and the CSE is terminated.

In State 3, the CSE first determines whether there is one or more objects defined for the active model. If there is only one object defined for the active model, the CSE sets "active object" attribute to this object and proceeds to State 4. On the active model, the CSE controls the presentation interface to display the list of available objects (which are defined in the information model) and prompts the user to select one. If the user selects one of the objects, the CSE sets an "active object" attribute to the selected object and proceeds to State 4. If the user decides to cancel, the CSE returns to State 2, from which the CSE then proceeds to State 7 in which the active model is terminated.

In State 4, the CSE first determines whether there is an action class flag associated with the active object. If there is one, the CSE substitutes all action flags associated with the action's class as valid action flags. If there is only one action flag, the CSE sets an action associated with the action flag to "active action" and proceeds to state 5. On the other hand, if there is more than one action flag, the CSE controls the presentation interface to display the list of action names associated with action flags of the active objects and prompts the user to select one. If the user selects one of the actions, the CSE sets an "active action" attribute to the action associated with the action name of the selected action of the active object and proceeds to State 5. If the user decides to cancel, the CSE goes back to State 3. If the user decides to exit, the CSE proceeds to State 7. If the user decides, however, to access another information model during State 4, the CSE sets the active model's next state equal to 4, suspends the active model and proceeds back to State 2.

In State 5, processing begins by first setting all values of the attributes to zero. Then a test is performed to determine whether the active object has an associated link object. If so, the CSE activates the instant of the link object. If activation for a link object fails, the CSE returns to state 4. If the activation for the link object has been successful, or if the active object does not have an associated link object, then the routine continues by determining whether the active object requires an active instant. If so, the CSE then activates the instant using a select condition if one exists in the active object. (The select activation constraint of the object maps directly to a select call associated with the database 20). If activation fails, and there is no learn flag, the CSE goes to state 4. If activation is successful or no activation is required, the CSE goes to State 6. If activation fails and there is a learn flag, the CSE also goes to state 6 because the learn flag instructs the CSE to accept an empty instant even though an active instant might otherwise be required. For example, in an appointment calender information model, the database will not necessarily contain the instances corresponding to all calender dates. When the user requests to see the data for a specific page of the calender and no data for such page exists in the database, the learn flag allows the CSE to accept the empty page as an active page with no data in it so that when the user enters the data on this page it will be entered into the database. Also, the CSE executes any activation propagation expression if one exists for the active instant.

In State 6, the routine first determines if there is any function flag associated with the active action. If one or more function flags exist, then for each function flag, the CSE executes the associated function and any process propagation expression associated with the active object over all instants which satisfy activation constraints in the object. The function may be an instantiation function, e.g., a user instantiation function which interacts with the user using the presentation interface and presentation control flags. The CSE will also process any attribute flags by mapping the attribute flags into appropriate functions. For example, the presentation flags are used to create windows and control the interaction with the data in the window. Only data that satisfies attribute constraints is accepted and upon acceptance, the CSE also executes any propagation expression associated with any attribute.

If no function is associated with the active action exist or if the functions associated with the active action have been successfully executed, the routine continues by determining if any object type flag is primitive or atomic. If not, the CSE goes to state 4 to select the next action. If yes, then the CSE determines whether the current action has an update instant or delete instant (instant propagation type action control) flag. If an update instant flag exists, active instants are updated or an empty instant is added to the database. If an delete instant flag exists, the CSE deletes an active instant and ignores empty instants. The CSE then returns to state 4. If an error occurs during any of these activities, the CSE returns to state 4 with an event flag indicating a failure.

In State 7, the active model is terminated and the CSE activates the most recently suspended model is one exists and goes to the next state of the activated model; otherwise the CSE returns to State 2.

In State 8, the CSE is terminated. Once the CSE is initialized it executes through its various states until State 8 is reached. As the CSE executes, the functionality defined in the information model is effected in the same way as a prior art source code program executes.

An exemplary implementation of several information models for use in the MICS can now be illustrated. In this example, the MICS includes three information models: an appointment calender (MODEL CALENDER), a notepad (MODEL NOTEPAD) and a complex medical system (MODEL MEDICAL). The Calender model includes a dictionary short list of attributes (such as the date, day of week, time and daily time increments) and just one object. The object includes a initial values expression that initializes the date, the day of week and the time to current system date, day of week and time, an default values expression that sets the value of the day of week attribute to a corresponding value of the date attribute, and a constraint assignment expression that sets the date to prevdate (date−1) or nextdate (date+1) based on EVENT prey and next, respectively. Likewise, the notepad model includes a dictionary of short list of attributes and a single object. The medical system includes a dictionary of attributes and numerous objects. The system control tables consisting of action and function control flags is also provided to understand the examples.

SYSTEM CONTROL TABLES

ACTION
ADD,EMPTY INSTANT,DATABASE,UPDATE INSTANT,USR_INSTANTIATION
UPDATE,ACTIVE INSTANT,DATABASE,UPDATE INSTANT,USR_INSTANTIATION
DELETE,ACTIVE INSTANT,DATABASE,DELETE INSTANT,USR_INSTANTIATION
REPORT,ACTIVE INSTANT,REPORT,0,0,CREATE_REPORT
CREATE ATOMIC DATA,ACTIVE INSTANT,ANALYSIS,UPDATE INSTANT,
CREATE_ATOMIC_DATA
GRAPH,ACTIVE INSTANT,ANALYSIS,0,0,GRAPH
LEARN ASSOCIATION,ACTIVE INSTANT,ANALYSIS,0,0,LEARN_ATOMIC_DATA
USE ASSOCIATION,ACTIVE INSTANT,ANALYSIS,0,0,USE_ATOMIC_DATA
MODEL CALENDER
DICTIONARY
   DATE,D,I,6,1
     DAY OF WEEK,D,D,8,1
       CONSTRAINT, ASSIGNMENT
      [DAY OF WEEK] = [DATE].
   TIME,T,I,6,1
       CONSTRAINT, ASSIGNMENT

-continued

SYSTEM CONTROL TABLES

```
       [TIME] = [TIME].
08:30 A.M.,C,0,60
09:00 A.M.,C,0,60
10.00 A.M.,C,0,60
11.00 A.M.,C,0,60
11.30 A.M.,C,0,60
01.00 A.M.,C,0,60
01.30 A.M.,C,0,60
02.00 A.M.,C,0,60
02.30 A.M.,C,0,60
03.00 A.M.,C,0,60
03.30 A.M.,C,0,60
04.00 A.M.,C,0,60
04.30 A.M.,C,0,60
05.00 A.M.,C,0,60
06.30 A.M.,C,0,60
07.00 A.M.,C,0,60
    NOTE    ,C,0,60
    TODO    ,C,0,60
#OBJECT  CALENDER,PRIMITIVE,SYNONYM OF
DICTIONARY,UPDATE,LEARN
       INITIAL VALUES
       [DATE] = DATE −1.
       CONSTRAINT,INSTANT
       (NEXT INSTANT) [DATE] = [DATE] +1;
       (PREV INSTANT) [DATE] = [DATE] −1.
DAY OF WEEK,TEMP
#INDEX CALENDAR,DATE,UNIQUE
#END
#MODEL NOTEPAD
#DICTIONARY
DATE,D,I,8
TIME,T,T,6
REFERENCE,C,0,12
TEXT,C,0,480
#OBJECT NOTE,PRIMITIVE,UPDATE,LEARN
       INITIAL VALUES
       [DATE]= DATE −1.
       SELECT,INSTANT
       (NEXT INSTANT) [DATE] = [DATE] +1;
       (PREV INSTANT) [DATE] = [DATE] −1.
DATE,GROUP=100,SETDATE,FPROT
TIME,GROUP=100,SETTIME,FPROT
REFERENCE,GROUP=100
TEXT,GROUP=101,PHIDE
#INDEX NOTE,DATE,UNIQUE
#END
#MODEL MEDICAL SYSTEM
#DICTIONARY
#rem patient master record attributes
ENTER DATE,d,i,6
FROM_DATE,d,i,6,1
TO_DATE,d,i,6,1
ACNT NO,long,0,8
       default value
       [ACNT NO] = SEQNUMBER.
VISIT FIRST,d(ate),I(longdate),8
LAST,d,i,8
OB DUE,d,i,8
RECALL,d,i,8
PATIENT NAME,A(uppercase),name,30
NICOE NAME,A,n,30
ADDRESS,A,0,30
CITY,A,0,15
STATE,A,0,2
       constraint,values
       AL — Alabama,AZ — Arizona,AR — Arkansas,CA — California,CT —
Connecticut, CO — Colorado, AR — Arizona,AL — Alabama,DE —
Delaware,DC — District of Columbia,FL — Florida, GA — Georgia,ID —
Idaho,IL — Illinois,IN — Indiana, IA — Iowa,ID — Idaho,KS —
Kansas,KY — Kentucky,LA — Louisiana,ME — Main,MD — Maryland,MA —
Massachusetts,MI — Michigan,MN — Minnesota,MS — Mississippi,MO —
Missouri,MT — Montana,NE — Nebraska,NV — Nevada,NH — New Hemp,NJ —
New Jersey,NM — New Mexico,NY — New York,NC — North Carolina, OH —
Ohio,OK — Oklahoma,OR — Oregon,PA — Pennsylvania,RI — Rhode
Island, SC — South Carolina, SD — South Dakota,TN — Tennessee,TX —
Texas,  UT — Utah,VT — Vermont,VA — Virginia, WA —
Washington,WV — West Virg, WI — Wisconsin,WY — Wyoming.
ZIP CODE,1,z,9
BIRTHDATE,d,i,6
```

SYSTEM CONTROL TABLES
-continued

SEX,A,0,1
    constraint,values
        M — MALE,F — FEMALE.
MARITAL STATUS,A,0,1
    constraint,values
        S — single,M — married,O — other.
PHONE NO(HOME),s,phone,10,0
NICOE PHONE NO,s,p,10,0
(OFFICE),s(scintific),p,10,0
SOCIAL SEC.#,1,s,9
DRIVER LIC.#,1,0,9
CREDIT CARD#,S,0,16,0
TYPE,c,0,10
EMPLOYMENT STATUS,c,0,1
    constraint,values
        e — employed,f — full time student,p — part time
student.
OCCUPATION,A,0,17
SPOUSE/GUARDIAN NAME,A,n,30
RELATIONSHIP,f,0,1
    constraint,values
        S — self,s — spouse,c — child,o — other.
RESP. PARTY'S NAME,A,n,30
EMPLOYER'S NAME,A,0,30
INSURED?,A,0,1
    constraint,values
        Y — YES, N — NO.
CARRIER CODE,c,0,8
OTHER INSURANCE?,A,0,1
    constraint,values
        Y — YES, N — NO.
INSURED'S NAME,A,n,30
PLAN NAME,c,0,20
INS ID,c,0,12
GROUP ID,c,0,12
ACTIVE STMNT,i,0,4
    default value
        [ACTIVE STMNT] = 1.
STMNT NUMBER,i,0,2
STMNT,i,0,4
STM#,i,0,2
PATIENT PORTION,r,0,10,2
INSURANCE COVERAGE(%),i,0,3
    propagation
        [PATIENT PORTION] = (100 − [INSURANCE COVERAGE(%)]) * .01 * ([BALANCE] − [DEDUCTLIBLE]);
        [PATIENT PORTION] = [PATIENT PORTION] + [DEDUCTIBLE].
DEDUCTIBLE,i,0,4
AUTHORIZATION NO,c,0,12
PATIENT PAYMENTS,r,0,10,2
INSURANCE PAYMENTS,r,0,10,2
CONDITION RELATED TO JOB?,A,0,1
    constraint,values
        Y — YES, N — NO.
AUTO ACCIDENT?,A,0,1
    constraint,values
        Y — YES, N — NO.
OTHER ACCIDENT?,A,0,1
    constraint,values
        Y — YES, N — NO.
FACILITY,c,0,25
REFERRING PHYSICIAN,c,0,25
PHYSICIAN ID,1,0,10
DATE OF SYMPTOM (CURRENT),d,i,6
(PRIOR),d,i,6
OUTSIDE LAB?,A,0,1
    constraint,values
        Y — YES, N — NO.
LAB AMNT,r,0,10,2
MEDICAID RESUB CODE,c,0,12
ORIGINAL REF NO,c,0,12
BILLING DATE,d,i,6
INS BILLING DATE,d,i,6
UNBL TO WORK (FROM),d,i,6
(TO),d,i,6
HOSPITAL DATE (FROM),d,i,6
INSURANCE TYPE,A,0,1
    constraint,values
        E — MEDICARE,D — MEDICAID,G — GROUP HEALTH PLAN.
BALANCE,r,0,8,2
CREDITS,r,0,8,2

-continued
SYSTEM CONTROL TABLES

```
CHARGES,r,0,8,2
POST AMOUNTS,r,0,8,2,1
#rem billing table attributes
TRANS DATE,d,i,8
        constraint,condition
        ([TRANS DATE] LE DATE).
        description
        Enter date when service started for this procedure.
TO DATE,d,i,8
        constraint,condition
        ([TO DATE] LE DATE); ([TO DATE] GE [TRANS DATE]).
        description
        Enter date when service ended for this procedure
        in case of surgery or pregnancy to and from dates
        may be different.
PS,c,0,2
        constraint,values
        ih — in patient hospital,oh — out patient hospital, o —
office.
TS,c,0,1
        constraint,values
        1 — medical care,2 — surgery,3 — consultation,4 —
xray,5 — laboratory,
        8 — assistant surgery,9 — other medical service,
        0 — blood or packed red shell.
UNIT,i,0,2
AMOUNT,r,0,8,2
AMOUNTS,r,0,8,2
OLD AMOUNT,r,0,8,2
#rem procedure code and diagnosis table attributes
CODE,c,0,4
        description
        Enter four byte alias procedure code or payment/adjust.
codes:
        payments — pca(cash), pck(check), pin(insurance),
pcl(collection):payment error adjust. — cpe(credit posting
error) or dpe(debit): payment — dop(refund), drc(return
check), drc(return check fee): dlf(legal/court), dfc(finance
charge): charges adjustment — cad(credit) or dda(debit) or
ccd(discount).
        propagation
        [AMOUNT] — [AMNT]; ([UNIT] EQUAL TO 0) [UNIT] = 1.
CPT4 CODE,c,c,7
        description
        enter valid cpt4 codes in case of payment
        er same as code or skip the field.
MED CODE,c,0,7
        description
        enter alternate procedure code used by
medicare
medicaid.
CTYPE,i,0,2
        constraint,values
        1 — OBSTETRICS, 2 — SONOGRAM, 3 — LASER, 4 — MEDICAL
        5 — GYNECOLOGY/SURGERY, 6 — OFFICE, 7 — OTHER SERVICE,
        8 — INSURANCE PAYMENT, 9 — OTHER PAYMENT, 10 — REFUND,
        11 — CHARGE/CREDIT ADJST, 12 — CHARGE/DEBIT ADJST,
        13 — PMNT/CREDIT ADJST, 14 — PMNT/DEBIT ADJST.
MONTH,d,M,6
OBSTETRICS,r,0,8,2
SONOGRAM,r,0,8,2
LASER,r,0,8,2
MEDICAL LAB,r,0,8,2
GYNECOLOGY,r,0,8,2
OFFICE,r,0,8,2
OTHER SERVICE,r,0,8,2
INSURANCE PAYMENT,r,0,8,2
OTHER PAYMENT,r,0,8,2
PAYMENT,r,0,8,2
REFUND,r,0,8,2
CREDIT ADJST,r,0,8,2
OTHER,r,0,8,2
DEBIT ADJST,r,0,8,2
PMNT/CDT ADJST,r,0,8,2
PMNT/DBT ADJST,r,0,8,2
PRIMARY,r,0,8,2
MEDICARE/CAID,r,0,8,2
SANUS,r,0,8,2
PRUCARE,r,0,8,2
NORTH TX,r,0,8,2
DALLAS,r,0,8,2
```

SYSTEM CONTROL TABLES

-continued

AETNA,r,0,8,2
BLUE CHOICE,r,0,8,2
CHAMPUS,r,0,8,2
SANUS PPO,r,0,8,2
TRAVELERS,r,0,8,2
PTYPE 12,r,0,8,2
PTYPE 13,r,0,8,2
PTYPE 14,r,0,8,2
PTYPE 15,r,0,8,2
DESCRIPTION,c,0,54
CDFLG,i,0,2
    constraint,values
        1 — debit,−1 — credit.
AMNT,r,0,8,0
    description
    charges shoud be amount you charge
    for procedure. In other case it is 0.
DIAG,c,0,8
    description
    Enter user defined identification pick
    set of letters from diognosis description.
ICD9 CODE,c,0,8
    description
    Enter valid diagnosis code from icd 9 code book.
DIOGNOSIS,A,0,54
rem insurance company table attributes
CARRIER NAME,c,0,30
PHONE NO,s,p,10,0
(800) NO,s,p,10,0
FAX NO,s,p,10,0
(ADDRESS),A,0,30
(CITY),A,0,17
(STATE),A,0,2
    constraint,values
    =STATE.
(ZIP CODE),1,z,9
ITYPE,i,0,2
    constraint,value
    01 — PRIMARY, 02 — MEDICARE/CAID, 03 — SANUS, 04 —
PRUCARE,05 — NORTH TX, 06 — DALLAS, 07 — AETNA, 08 — BLUE
CHOICE,09 — CHAMPUS, 10 — SANUS PPO, 11 — TRAVELERS, 12 —
PTYPE 12, 13 — PTYPE 13, 14 — PTYPE 14, 15 — PTYPE 15.
PTYPE,i,0,2
rem doctor's information attributes
DOCNAME,c,0,26
LINE1,c,0,26
LINE2,c,0,26
LINE3,c,0,26
LINE4,c,0,26
PIN,c,0,10
FEDTAXID,c,0,10
IDTYPE,c,0,1
    constraint,values
    S — SSN,E — EIN.
ASSIGNMENT,b,0,1
ACNT STRING,c,0,26
TOTAL OF AMOUNT,r,0,8,2
    constraint,assignment
    [TOTAL OF AMOUNT] = COLSUM([AMOUNT]).
rem accounting information attributes
CHECK DATE,d,i,8
ACNT CODE,i,0,2
    constraint,values
    1 — RENT,2 — TELEPHONE,3 — ANSWERING SERVICE,4 —
UTILITIES, 5 — POSTAGE,6 — MEDICAL LAB,7 — MEDICAL SUPPLY,8 —
OFFICE SUPPLY,9 — AUTO INSURANCE,10 — MALPRACTICE
INSURANCE,11 — HEALTH INSURANCE,12 — OTHER INSURANCE, 13 —
TRADE DUES,14 — SEMINAR TRAINING,15 — PROFESSIONAL SERVICE,16 —
ENTERTRAINMENT/GIFTS,17 — ACCOUNTING & LEGAL, 18 — CONTRACT
SERVICE,19 — AUTO EXPENSE, 20 — OSHA EXPENSE, 21 — REFUNDS,22 —
LEASE PAYMENT,23 — LOAN PAYMENT,24 — PAYROLL,25 —
TRANSFER,26 — ALL OTHER.
CHECK NO,i,0,5
CHECK AMNT,r,0,8,2
REFERENCE,c,0,20
rem journal record attributes
JRNL DATE,d,i,8
F,i,0,2
POST AMNT,r,0,8,2
OBJECT PATIENT CHART,PRIMITIVE,DATABASE
ACNT NO,GROUP=100,FPROT

-continued
SYSTEM CONTROL TABLES

```
VISIT FIRST,GROUP=100,FPROT,SETDATE
LAST,GROUP=100,FPROT,SETDATE
PATIENT NAME,GROUP=102,MFILL
ADDRESS,GROUP=103,MFILL
CITY,GROUP=104,MFILL
STATE,GROUP=104,MFILL
ZIP CODE,GROUP=104,MFILL
BIRTHDATE,GROUP=105,MFILL
SEX,GROUP=105,MFILL
MARITAL STATUS,GROUP=105,MFILL
PHONE NO(HOME),GROUP=106,RJUST
(OFFICE),GROUP=106,RJUST
SOCIAL SEC.#,GROUP=107
DRIVER LIC.#,GROUP=107
CREDIT CARD#,GROUP=108
TYPE,GROUP=108
EMPLOYMENT STATUS,GROUP=108
OCCUPATION,GROUP=109
EMPLOYER'S NAME,GROUP=109
SPOUSE/GUARDIAN NAME,GROUP=111
RELATIONSHIP,GROUP=112
PHONE NO(HOME),GROUP=112,DATA=1,RJUST
(OFFICE),GROUP=112,DATA=1,RJUST
OCCUPATION,GROUP=113,DATA=1
EMPLOYER'S NAME,GROUP=113,DATA=1
RESP. PARTY'S NAME,GROUP=115
RELATIONSHIP,GROUP=115,DATA=1
BIRTHDATE,GROUP=116,DATA=1
SEX,GROUP=116,DATA=1
SOCIAL SEC.#,GROUP=116,DATA=1
DRIVER LIC.#,GROUP=117,DATA=1
CREDIT CARD#,GROUP=117,DATA=1
TYPE,GROUP=117,DATA=1
PHONE NO(HOME),GROUP=118,DATA=2,RJUST
(OFFICE),GROUP=118,DATA=2,RJUST
ADDRESS,GROUP=119,DATA=1
CITY,GROUP=120,DATA=1
STATE,GROUP=120,DATA=1
ZIP CODE,GROUP=120,DATA=1
OCCUPATION,GROUP=121,DATA=2
EMPLOYER'S NAME,GROUP=121,DATA=2
INSURED?,GROUP=122
CARRIER CODE,GROUP=122
PLAN NAME,GROUP=123
INS ID,GROUP=123
GROUP ID,GROUP=123
OTHER INSURANCE?,GROUP=125
CARRIER CODE,DATA=1,GROUP=125
PLAN NAME,GROUP=126,DATA=1
INS ID,GROUP=126,DATA=1
GROUP ID,GROUP=126,DATA=1
INSURED'S NAME,GROUP=127
RELATIONSHIP,GROUP=127,DATA=2
BIRTHDATE,GROUP=128,DATA=2
SEX,GROUP=128,DATA=2
EMPLOYER'S NAME,GROUP=128,DATA=3
ACTIVE STMNT,GROUP=130
BALANCE,GROUP=130,FPROT
OB DUE,GROUP=130
RECALL,GROUP=130
CHARGES,TEMP,FHIDE
POST AMOUNTS,TEMP,FHIDE
CREDITS,TEMP,FHIDE
PATIENT PORTION,GROUP=131
INSURANCE COVERAGE(%),GROUP=131
DEDUCTABLE,GROUP=131
BILLING DATE,GROUP=132
INS BILLING DATE,GROUP=132
PATIENT PAYMENTS,GROUP=133
INSURANCE PAYMENTS,GROUP=133
INSURANCE TYPE,GROUP=134
AUTHORIZATION NO,GROUP=134
MEDICAID RESUB CODE,FHIDE
ORIGINAL REF NO,FHIDE
DATE OF SYMPTOM (CURRENT),FHIDE
(PRIOR),FHIDE
REFERRING PHYSICIAN,FHIDE
PHYSICIAN ID,FHIDE
FACILITY,FHIDE
HOSPITAL DATE (FROM),FHIDE
(TO),FHIDE
```

-continued
SYSTEM CONTROL TABLES

UNBL TO WORK (FROM),GROUP=140,FHIDE
(TO),DATA=1,FHIDE
OUTSIDE LAB?,FHIDE
LAB AMNT,FHIDE
NICOE NAME,GROUP=137
NICOE PHONE NO,GROUP=137
CONDITION RELATED TO JOB?,FHIDE
AUTO ACCIDENT?,FHIDE
OTHER ACCIDENT?,FHIDE
OBJECT BILLING DATA,PRIMITIVE,JOURNAL_RCD,HIDE
ACNT NO,DPROT
STMNT,DPROT
TRANS DATE
TO DATE
PS
TS
CODE
DIAG
UNIT
AMOUNT
DESCRIPTION,TEMP
AMOUNTS,FHIDE,TEMP
OLD AMOUNT,FHIDE,TEMP
POST AMNT,FHIDE,TEMP
OBJECT BILLING DATABASE,VIEW of BILLING DATA,DATABASE
    initial values
    SETVALUE([STMNT],[ACTIVE STMNT]).
    activation propagation
    [OLD AMOUNT] = [AMOUNT] * [UNIT] * [CDFLG].
    propagation
    (POST AMNT] = [AMOUNT] * [UNIT] * [CDFLG] − [OLD
AMOUNT];
    [POST AMOUNTS] = [POST AMOUNTS] + [POST AMNT];
    (([CTYPE] EQUAL TO 9) AND ([POST AMNT] > 0))
    [PATIENT PAYMENTS] = [PATIENT PAYMENTS] + [POST AMNT];
    (([CTYPE] EQUAL TO 8) AND ([POST AMNT] > 0))
    [INSURANCE PAYMENTS] = [INSURANCE PAYMENTS]+[POST AMNT];
    [LAST] = DATE;
    ([STMNT] > [ACTIVE STMNT]) [ACTIVE STMNT] = [STMNT].
    link propagation
    ([POST AMOUNTS] != 0) [BALANCE] = [BALANCE] + [POST
AMOUNTS].
DOCNAME,FHIDE,HEADER,DPROT
LINE1,FHIDE,HEADER,DPROT
LINE2,FHIDE,HEADER,DPROT
LINE3,FHIDE,HEADER,DPROT
LINE4,FHIDE,HEADER,DPROT
ACNT STRING,PHIDE,COL=50,GROUP=98,FPROT,DPROT
PATIENT NAME,GROUP=100,FPROT,PHIDE,COL=5,DPROT
ACNT NO,GROUP=100,FPROT,COL=55,DPROT
ADDRESS,GROUP=101,FPROT,PHIDE,COL=5,DPROT
STMNT,GROUP=101,FPROT,COL=57,DPROT
CITY,GROUP=102,FPROT,PHIDE,COL=5,DPROT
STATE,GROUP=102,FPROT,PHIDE,FCAT,DPROT
ZIP CODE,GROUP=102,FPROT,PHIDE,FCAT,DPROT
BALANCE,GROUP=102,COL=55,DPROT
STMNT,GROUP=105,ENTRY=10,RSKIP
TRANS DATE,GROUP=105,ENTRY=10
TO DATE,GROUP=105,ENTRY=10,RSKIP
CODE,GROUP=105,ENTRY=10,RSKIP
AMOUNT,GROUP=105,ENTRY=10,RSKIP
UNIT,GROUP=105,ENTRY=10,RSKIP
PS,GROUP=105,ENTRY=10,RSKIP
TS,GROUP=105,ENTRY=10,RSKIP
DIAG,GROUP=105,ENTRY=10,RSKIP
DESCRIPTION,GROUP=105,ENTRY=10,FPROT
AMOUNTS,GROUP=105,ENTRY=10,WSKIP,RJUST
CHARGES,GROUP=106,WSKIP
CREDITS,GROUP=106,WSKIP
BALANCE,GROUP=106,WSKIP,DPROT
TOTAL OF AMOUNT,RSKIP,TEMP
POST AMOUNTS,FHIDE
OLD AMOUNT,FHIDE
CDFLG,FHIDE,TEMP
OBJECT REMOVE VISIT CHARGE,SYNONYM OF BILLING DATABASE,UPDATE
    activation propagation
    =BILLING DATABASE.
OBJECT PRINT INSURANCE FORM,VIEW of BILLING
DATA,NOLINE,REPORT,GROUP=6
    initial values
    [STMNT NUMBER] = [ACTIVE STMNT];

-continued
SYSTEM CONTROL TABLES

GETVALUE([STMNT NUMBER]).
    activation propagation
    [AMOUNTS] = [AMOUNT] * [UNIT];
    ([CDFLG]EQUAL TO 1) [CHARGES] = [CHARGES] + [AMOUNTS];
    ([CDFLG] EQUAL TO −1) [CREDITS] = [CREDITS] + [AMOUNTS].
    constraint,condition
    (([CDFLG] EQUAL TO 1) AND ([AMOUNT] > 0) AND ([STMNT]
EQUAL TO [STMNT NUMBER])).
    post propagation
    [POST AMOUNTS] = 0; [CREDITS] = 0; [CHARGES] = 0.
CARRIER NAME,PHIDE,ROW=1,COL=43
(ADDRESS),PHIDE,ROW=2,COL=43
(CITY),PHIDE,ROW=3,COL=43
(STATE),PHIDE,ROW=3,FCAT
(ZIP CODE),PHIDE,ROW=3,FCAT
INSURANCE TYPE,PHIDE,ROW=7,COL=2
INS ID,PHIDE,ROW=7,COL=50
PATIENT NAME,PHIDE,ROW=9,COL=1
BIRTHDATE,PHIDE,ROW=9,COL=30
SEX,PHIDE,ROW=9,COL=41,BOX=5
RESP. PARTY'S NAME,PHIDE,ROW=9,COL=50
ADDRESS,PHIDE,ROW=11,COL=1
RELATIONSHIP,DATA=1,PHIDE,ROW=11,COL=32,BOX=5
ADDRESS,DATA=1,PHIDE,ROW=11,COL=50
CITY,PHIDE,ROW=13,COL_1
STATE,PHIDE,ROW=13,COL=26
MARITAL STATUS,PHIDE,ROW=13,COL=34,BOX=5
CITY,DATA=1,PHIDE,ROW=13,COL=50
STATE,DATA=1,PHIDE,ROW=13,COL=74
ZIP CODE,PHIDE,ROW=15,COL=1
PHONE NO(HOME),PHIDE,RJUST,COL=13
EMPLOYMENT STATUS,PHIDE,COL=34,ROW=15
ZIP CODE,DATA=1,PHIDE,ROW=15,COL=50
PHONE NO(HOME),PHIDE,RJUST,ROW=15,COL=63
INSURED'S NAME,DATA=1,PHIDE,ROW=17,COL=1
GROUP ID,PHIDE,ROW=17,COL=50
GROUP ID,DATA=1,PHIDE,ROW=19,COL=1
CONDITION RELATED TO JOB?,PHIDE,BOX=6,ROW=19,COL=34
BIRTHDATE,DATA=1,PHIDE,ROW=19,COL=53
SEX,DATA=1,PHIDE,ROW=19,COL=69,BOX=5
BIRTHDATE,DATA=2,PHIDE,ROW=21,COL=1
SEX,DATA=2,PHIDE,ROW=21,COL=17,BOX=6
AUTO ACCIDENT?,PHIDE,ROW=21,COL=34,BOX=6
EMPLOYER'S NAME,DATA=2,PHIDE,ROW=21,COL=50
EMPLOYER'S NAME,DATA=3,PHIDE,ROW=23,COL=1
OTHER ACCIDENT?,PHIDE,ROW=23,COL=34,BOX=6
PLAN NAME,PHIDE,ROW=23,COL=50
PLAN NAME,DATA=1,PHIDE,ROW=25,COL=1
OTHER INSURANCE?,PHIDE,ROW=25,COL=51,BOX=5
DATE OF SYMPTOM (CURRENT),PHIDE,ROW=31,COL=2
(PRIOR),PHIDE,ROW=31,COL=38
UNBL TO WORK (FROM),PHIDE,ROW=31,COL=54
(TO),DATA=1,PHIDE,ROW=31,COL=68
REFERRING PHYSICIAN,PHIDE,ROW=33,COL=1
PHYSICIAN ID,PHIDE,ROW=33,COL=29
HOSPITAL DATE (FROM),PHIDE,ROW=33,COL=54
(TO),PHIDE,ROW=33,COL=68
OUTSIDE LAB?,PHIDE,ROW=35,COL=52
LAB AMNT,PHIDE,ROW=35,COL=62
MEDICAID RESUB CODE,PHIDE,ROW=37,COL=50
ORIGINAL REF NO,PHIDE,ROW=37,COL=62
AUTHORIZATION NO,PHIDE,ROW=39,COL=51,LINE=1
TRANS DATE,PHIDE,ENTRY=6,ROW=43,COL=1,LINE=1
TO DATE,PHIDE,ENTRY=6,ROW=43,COL=10
PS,PHIDE,ENTRY=6,ROW=43,COL=19
TS,PHIDE,ENTRY=6,ROW=43,COL=22
CPT4 CODE,PHIDE,ENTRY=6,ROW=43,COL=25
DIAG,PHIDE,ENTRY=6,ROW=43,COL=42
AMOUNT,PHIDE,ENTRY=6,ROW=43,COL=48,RJUST
UNIT,PHIDE,ENTRY=6,ROW=43,COL=58
FEDTAXID,PHIDE,DPROT,ROW=55,COL=2
IDTYPE,PHIDE,DPROT,ROW=55,COL=16,BOX=3
ACNT NO,PHIDE,DPROT,ROW=55,COL=23
ASSIGNMENT,PHIDE,DPROT,ROW=55,COL=37
CHARGES,PHIDE,ROW=55,COL=50,RJUST
PATIENT PAYMENTS,PHIDE,FHIDE
CHARGES,PHIDE,ROW=55,COL=69,RJUST
DOCNAME,PHIDE,DPROT,ROW=57,COL=51
LINE1,PHIDE,DPROT,FHIDE
LINE2,PHIDE,DPROT,ROW=58,COL=51
LINE3,PHIDE,DPROT,ROW=59,COL=51

-continued
SYSTEM CONTROL TABLES

PIN,PHIDE,DPROT,ROW=60,COL=51
OBJECT DAILY JRNL,JOURNAL OF BILLING
DATA,BROWSE,CREATE,GROUP=32 16
    link initial values
        GETVALUE([FROM_DATE],[TO_DATE]).
    link constraint,condition
        (([TRANS DATE] GE [FROM_DATE]) AND ([TRANS DATE] LE [TO_DATE])).
    link activation propagation
        [F]= 1; [JRNL DATE] = [TRANS DATE]; [PTYPE] = [ITYPE];
        [POST AMNT] = [AMOUNT] * [UNIT] *[CDFLG].
    link propagation
        [F] = 1; (ACTIVE INSTANT) [F] = 2; [JRNL DATE] = DATE;
        [PTYPE] = [ITYPE].
JRNL DATE
ACNT NO
PATIENT NAME
TRANS DATE
STMNT
CODE
CDFLG
CTYPE
PTYPE
F
POST AMNT
OBJECT DAILY RECONCILIATION,VIEW OF DAILY
JRNL,BROWSE,REPORT,GROUP=16,PAGE
    activation propagation
        ([CTYPE] < 8) [CHARGES] = [CHARGES] + [POST AMNT];
        (([CTYPE] EQUAL TO 8) OR ([CTYPE] EQUAL TO 9))
[PAYMENT] = (PAYMENT] + [POST AMNT];
        ([CTYPE] EQUAL TO 10) [REFUND] = [REFUND] + [POST AMNT];
        ([CTYPE] EQUAL TO 11) [CREDIT ADJST]=[CREDIT ADJST]+[POST AMNT];
        ([CTYPE] EQUAL TO 12) [DEBIT ADJST]=[DEBIT ADJST] + [POST AMNT];
        ([CTYPE] EQUAL TO 13) [PMNT/CDT ADJST]=[PMNT/CDT ADJST]+[POST AMNT];
        ([CTYPE] EQUAL TO 14) [PMNT/CDT ADJST]=[PMNT/DBT ADJST] + [POST AMNT].
JRNL DATE,ENTRY=16,GROUP=100
ACNT NO,ENTRY=16,GROUP=100
PATIENT NAME,ENTRY=16,GROUP=100
TRANS DATE,ENTRY=16, GROUP=100,WSKIP
STMNT,ENTRY=16,GROUP=100
CTYPE,ENTRY=16,GROUP=100,WSKIP,RSKIP
F,ENTRY=16,GROUP=100,WSKIP,RSKIP
PTYPE,ENTRY=16,GROUP=100,WSKIP
CODE,ENTRY=16,GROUP=100
POST AMNT,ENTRY=16,GROUP=100
CHARGES,GROUP=101
PAYMENT,GROUP=101
REFUND,GROUP=101
CREDIT ADJST,GROUP=102
DEBIT ADJST,GROUP=102
PMNT/CDT ADJST,GROUP=103,WSKIP
PMNT/DBT ADJST,GROUP=103,WSKIP
OBJECT BILLING/INS MNGMNT,VIEW of PATIENT CHART,UPDATE
    constraint,condition
        ([BALANCE] > 1).
ACNT NO,GROUP=133,FPROT
VISIT FIRST,GROUP=133,FPROT
LAST,GROUP=133,FPROT
PATIENT NAME,GROUP=134,FPROT
PHONE NO(HOME),GROUP=134,DATA=2,FPROT,RJUST,PHIDE
(OFFICE),GROUP=134,DATA=2,FPROT,PHIDE
RESP. PARTY'S NAME,GROUP=136,FPROT
RELATIONSHIP,GROUP=136,DATA=1,FPROT
CARRIER CODE,GROUP=137
CARRIER NAME,GROUP=137,FPROT
PHONE NO,GROUP=138,RJUST
FAX NO,GROUP=138,RJUST
(800) NO,GROUP=138,RJUST
PLAN NAME,GROUP=139
INS ID,GROUP=139
GROUP ID,GROUP=139
DEDUCTABLE,GROUP=141
INSURANCE COVERAGE(%),GROUP=141
PATIENT PORTION,GROUP=141
BILLING DATE,GROUP=142

| SYSTEM CONTROL TABLES |
|---|
INS BILLING DATE,GROUP=142
PATIENT PAYMENTS,GROUP=143
INSURANCE PAYMENTS,GROUP=143
BALANCE,GROUP=143,FPROT
AUTHORIZATION NO,GROUP=145
OUTSIDE LAB?,GROUP=145
LAB AMNT,GROUP=145
MEDICAID RESUB CODE,GROUP=146
ORIGINAL REF NO,GROUP=146
DATE OF SYMPTOM (CURRENT),GROUP=147
(PRIOR),GROUP=147
REFERRING PHYSICIAN,GROUP=148
PHYSICIAIN ID,GROUP=148
FACILITY,GROUP=149
HOSPITAL DATE (FROM),GROUP=150
(TO),GROUP=150
UNBL TO WORK (FROM),GROUP=151
(TO),GROUP=151,DATA=1
CONDITION RELATED TO JOB?,GROUP=152
AUTO ACCIDENT?,GROUP=152
OTHER ACCIDENT?,GROUP=152
ACTIVE STMNT,GROUP=153,FPROT
OBJECT PRINT BILL,SYNONYM OF BILLING DATABASE,REPORT
    initial values
    =PRINT INSURANCE FORM.
    constraint,condition
    ([STMNT] EQUAL TO [STMNT NUMBER]).
    activation propagation
    =PRINT INSURANCE FORM.
OBJECT LIST OB DUE PATIENT,VIEW OF PATIENT
CHART,BROWSE,GROUP=16,REPORT,PAGE
    initial values
    GETVALUE([MONTH]).
    constraint,condition
    ([MONTH]EQUAL TO MMYYYY([OB DUE])).
PATIENT NAME
OB DUE
OBJECT LIST RECALL PATIENT,VIEW OF PATIENT
CHART,BROWSE,GROUP=16,REPORT,PAGE
    initial values
    GETVALUE([MONTH]).
    constraint,condition
    ([MONTH] EQUAL TO MMYYYYY([RECALL])).
PATIENT NAME
RECALL
OBJECT ACCOUNT BALANCE DUE,VIEW of PATIENT
CHART,GROUP=16,BROWSE,REPORT,PAGE
    constraint,condition
    ([BALANCE] > 1).
ACNT NO
PATIENT NAME
BALANCE
LAST
OBJECT PRACTICE ANALYSIS,ATOMIC OF DAILY JRNL,ANALYSIS
    link activation propagation
    [MONTH] = MMYYYY([JRNL DATE]);
    ([CTYPE] EQUAL TO 0) [CTYPE] = 1.
    link propagation
    SUMBY([CTYPE],[POST AMNT]);
    ([CTYPE] < 8) [CHARGES] = [CHARGES] + [POST AMNT];
    (([CTYPE] EQUAL TO 8) OR ([CTYPE] EQUAL TO 9))
[PAYMENT] = [PAYMENT] + [POST AMNT].
MONTH,DPROT,GROUP=10,COL=50,XAXIS
OBSTETRICS,GROUP=11,INPUT
SONOGRAM,GROUP=12,INPUT
LASER,CSUM,GROUP=13,INPUT
MEDICAL LAB,GROUP=14,INPUT
GYNECOLOGY,GROUP=15,INPUT
OFFICE,GROUP=16,INPUT
OTHER SERVICE,GROUP=17,INPUT
INSURANCE PAYMENT,GROUP=18,INPUT
OTHER PAYMENT,GROUP=19,INPUT
REFUND,GROUP=20,INPUT
CREDIT ADJST,GROUP=21,INPUT
DEBIT ADJST,GROUP=21,INPUT
PMNT/CDT ADJST,GROUP=22,INPUT
PMNT/DBT ADJST,GROUP=22,INPUT
CHARGES,GROUP=24,SERIES,OUTPUT
PAYMENT,GROUP=24,SERIES,OUTPUT
OBJECT INS CHARGES ANALYSIS,ATOMIC OF DAILY JRNL,ANALYSIS
    link activation propagation

SYSTEM CONTROL TABLES
*-continued*

```
        [MONTH] = MMYYYY([JRNL DATE]).
        link propagation
        (([PTYPE] > 0) AND ([CTYPE] < 8)) SUMBY([PTYPE],[POST
AMNT]);
        (([PTYPE] EQUAL TO 0) AND ([CTYPE] < 8)) [OTHER]
[OTHER] + [POST AMNT].
        activation propagation
        [CHARGES] = SUM([PRIMARY],[OTHER]).
MONTH,DPROT,COL=50
PRIMARY,GROUP=1
MEDICARE/CAID,GROUP=2
SANUS,GROUP=3
PRUCARE,GROUP=4
NORTH TX,GROUP=5
DALLAS,GROUP=6
AETNA,GROUP=7
BLUE CHOICE,GROUP=8
CHAMPUS,GROUP=9
SANUS PPO,GROUP=10
TRAVELERS,GROUP=11
PTYPE 12,GROUP=12
PTYPE 13,GROUP=13
PTYPE 14,GROUP=14
PTYPE 15,GROUP=15
OTHER,GROUP=16
CHARGES,GROUP=17,TEMP
#OBJECT PROCEDURE
CODE,PRIMITIVE,ADD,UPDATE,GROUP=16,REPORT,PAGE
CODE,PROTECT
CPT4 CODE,RSKIP
MED CODE,RSKIP
CDFLG,RSKIP
AMNT
CTYPE
DESCRIPTION,
#OBJECT INSURANCE COMPANY,PRIMITIVE,ADD,UPDATE,REPORT,PAGE
CARRIER CODE,GROUP=100,PROTECT
CARRIER NAME,GROUP=101
PHONE NO,GROUP=102,RJUST
(800) NO,GROUP=102,RJUST
FAX NO,GROUP=102,RSKIP,RJUST
(ADDRESS),GROUP=103,RSKIP
(CITY),GROUP=104,RSKIP
(STATE),GROUP=104,RSKIP
(ZIP CODE),GROUP=104,RSKIP
ITYPE,GROUP=105,RSKIP
#OBJECT DIAGNOSIS
CODE,PRIMITIVE,GROUP=16,ADD,UPDATE,REPORT,PAGE
ICD9 CODE
DIOGNOSIS
#OBJECT DOCTOR,TRANSIENT,HIDE
        initial values
        [DOCNAME] = "J. DOE, M.D., P.A.";
        [LINE1] = "OBSTETRICS and GYNECOLOGY";
        [LINE2] = "123 ANY STREET, SUITE 100";
        [LINE3] = "ANY TOWN, TEXAS 75200";
        [PIN] = "1177";
        (FEDTAXID] = "123456789";
        [ACNT STRING] = "STATEMEMT OF ACCOUNT";
        [IDTYPE] = "E";
DOCNAME
LINE1
LINE2
LINE3
PIN
FEDTAXID
IDTYPE
ACNT STRING
#OBJECT POST EXPENSES,PRIMITIVE,ADD,UPDATE,GROUP=16,REPORT,PAGE
CHECK DATE
ACNT CODE
CHECK NO
CHECK AMNT
REFERENCE
#OBJECT EXPENSE REPORT,SYNONYM OF POST
EXPENSES,BROWSE,REPORT,GROUP=16,PAGE
        initial values
        GETVALUE([MONTH]).
        constraint,condition
        ([MONTH) EQUAL TO MMYYYY([CHECK DATE])).
#index patient chart,1,UNIQUE,ACNT NO
```

SYSTEM CONTROL TABLES

```
#index patient chart,2,PATIENT NAME
#index billing data,1,ACNT NO
#index PROCEDURE CODE,1,CODE,UNIQUE
#index INSURANCE COMPANY,1,CARRIER CODE,UNIQUE
#index PRACTICE ANALYSIS,1,MONTH,UNIQUE
#index INS CHARGES ANALYSIS,1,MONTH,UNIQUE
#index POST EXPENSES,1,CHECK DATE
#index DAILY JRNL,1,JRNL DATE
#END
```

As can be seen, the medical system is much more complicated as compared to the simple notepad and calender applications. Despite the length of the information model itself, however, it should be appreciated that the model is all that is required for purposes of executing the business application. In other words, once the medical system information model is written, it is not required for the user to write source code or other high level code to implement the model. It is further not required that the user maintain source code or the like to implement enhancements or to correct errors. In this regard, all the user need do is to modify the information model (e.g., by adding an attribute, modifying or adding an object, changing an expression in an object, etc.). In operation, the information model is directly processed by the CSE. The MICS may include a preprocessor to process the expressions if desired and the functions can be embedded in the MICS or can be distinct therefrom and thus executed using IPC facilitites. The base MICS need not be changed or altered.

With reference to the medical system information model and the function set previously described, the trace of the CSE for the exemplary system can also be seen:

State 1: MICS initializes presentation interface and creates linked list of three models namely appointment calendar, notepad and medical system.

State 2: CSE displays three models using presentation interface. Assume the user conditions the medical system.

State 3: CSE displays the following objects to user using the presentation interface:
PATIENT CHART
BILLING DATABASE
PRINT BILL
PRINT INSURANCE FORM
DAILY RECONCILIATION
BILLING?INS MNGMNT
LIST OB DUE PATIENT
LIST RECALL PATIENT
ACCOUNT BALANCE DUE
PRACTICE ANALYSIS
INS CHARGE ANALYSIS
PROCEDURE CODE
INSURANCE COMPANY
DIAGNOSIS CODE
POST EXPENSES
EXPENSE REPORT Assuming the user conditions the PATIENT CHART object, the CSE proceeds to State 4:

State 4: CSE displays the following action associated with PATIENT CHART object using the presentation interface (note that these actions are displayed because they are the only action flags in the object and the actions associated with such action flags):
ADD
UPDATE
DELETE
VIEW Assume now that the user conditions UPDATE. The CSE then proceeds to state 5.

State 5: CSE sets all values of PATIENT CHART object to null. CSE looks for initial values expression of the PATIENT CHART. There are no such expressions; if one existed it would have been executed. The primary object has no associated link object so no instant is activated for a link object. The CSE then selects data object of the PATIENT CHART. Since PATIENT CHART type is primitive, the DATA OBJECT of PATIENT CHART is PATIENT CHART itself. Because the action instant type flag of an active action is ACTIVE INSTANT and PATIENT CHART has no contraint expression, the CSE instantiates instant of the DATA OBJECT as follows:

The CSE displays the following two keys using the presentation interface (because the PATIENT CHART instances are accessed by indexes or keys as indicated in the index at the end of the object):
ACCOUNT NO
PATIENT NAME Assuming the user enters the key value for PATIENT NAME, the CSE interacts until a valid key value is entered. The CSE also activates instant associated with PATIENT NAME by instantiating PATIENT CHART attributes using the the database interface. Assuming activation is successful, the CSE looks for an activation propagation expression associated with PATIENT CHART object. There is none here; if one existed it would have been executed.

State 6: CSE first determines if there is any function flag associated with the UPDATE action. In this case there is only one function USR_INSTANTIATION, so CSE executes usr_instantiation function. This function displays attributes to user using presentation control flags and the presentation interface. The user then modifies the attributes and returns an "event." If event is not "process", the CSE proceeds to an appropriate state described in the state 6 logic of the CSE. Assuming the selected event is "process", the CSE executes any propagation expression associated with the active object. In this case there is none. CSE then determines if DATA OBJECT associated with PRIMARY OBJECT is primitive or atomic. In this case DATA OBJECT of PRIMARY OBJECT PATIENT CHART is PATIENT CHART itself. Since PATIENT CHART is primitive, CSE then determines if active action has any instant propagation type flag. In this instant propagation type flag is UPDATE INSTANT. Since PATIENT CHART instant is ACTIVE INSTANT the CSE updates the instant of PATIENT CHART using the database interface. Assuming the update function using database interface is successful, the CSE proceeds to state 4. This completes the processing.

According to the invention, a user of the MICS simply writes information models rather than source code or the like. The information model 12 and functions 16 replace the common source code programs used in computer software systems of the prior art. To modify the operation of the program, the user need only change the information model and thus there is no software maintenance in the traditional sense. This approach is therefore radically different from prior art techniques and practices.

Thus a designer desiring to take advantage of the present invention builds models as opposed to applications, thereby allowing end users to create their own applications directly from the business model. As set forth above, a complete medical system is implemented using less than about 700 lines of an information model as compared to thousands upon thousands of lines of complex source code. The main processing engine of the MICS is the CSE machine in which each action creates an event, the event changes a state, and the state triggers an action. A model can be terminated during any state and can be restarted at the same state later. According to the invention, whenever a transaction is terminated, which may occur for example when another model is called for processing, the control engine saves the prior model and the state of the transaction. When the other processing is completed, the control engine reenters the previous transactions at the "action" level (as opposed to the instruction level). The control engine is thus reentrant at the action level.

In the preferred embodiment, the information model is defined with the assistance of a BNF grammar using an editor. The BNF grammar also facilitates dividing the application into a set of independent actions. The model is converted into information processing objects using a preprocessor or lexical analyzer that is based on the BNF grammar.

It should be appreciated by those skilled in the art that the specific embodiments disclosed above may be readily utilized as a basis for modifying or designing other structures or techniques for carrying out the same purposes of the present invention. It should also be realized by those skilled in the art that such equivalent constructions do not depart from the spirit and scope of the invention as set forth in the appended claims.

What is claimed is:

1. A control system for use in conjunction with a target computer having a user interface and a set of functions, comprising:

one or more information models, each information model representing a software application to be executed on the target computer, the software application having a process flow represented in the information model by a dictionary of attributes and at least one object, an attribute comprising a data entity and an object comprising control flags and a set of attributes taken from the dictionary of attributes, the object and one or more of the object's attributes including one or more control expressions that in conjunction with the control flags define the process flow of the software application; and a process flow control engine common to all information models and responsive to a particular information model (i) for activating the object defined in the information model, (ii) for activating an action defined by the control flags, (iii) for instantiating attributes of the object, and (iv) for processing functions over the instantiated attributes of the object using the control flag and/or expressions to thereby cause the process flow control engine to execute the particular information model directly and without generation of code normally associated with the software application.

2. A method for implementing software applications using object-oriented information models in lieu of conventional source code or other high level programming tools, comprising the steps of:

creating one or more information models, each information model representing a software application to be executed on a target computer, the software application having a process flow represented in the information model by a dictionary of attributes and at least one object, an attribute comprising a data entity and an object comprising control flags and a set of attributes taken from the dictionary of attributes, the object and one or more of the object's attributes including one or more control expressions that in conjunction with the control flags define the process flow of the software application; and executing on the target computer a process flow control engine common to all information models, the process flow control engine responsive to a particular information model (i) for activating the object defined in the information model, (ii) for activating an action defined by the control flags, (iii) for instantiating attributes of the object, and (iv) for processing functions over the instantiated attributes of the object using the control flag and/or expressions such that the process flow control engine executes the particular information model directly and without generation of code normally associated with the software application.

3. The method of claim 2 further including the step of modifying a particular software application by rewriting a portion of the information model.

4. The method of claim 2 further including the step of maintaining a particular software application by rewriting a portion of the information model.

5. A method, using a target computer, for implementing software applications using object-oriented information models in lieu of conventional source code or other high level programming tools, each information model representing a software application to be executed on a target computer, the software application having a process flow represented in the information model by a dictionary of attributes and at least one object, an attribute comprising a data entity and an object comprising control flags and a set of attributes taken from the dictionary of attributes, the object and one or more of the object's attributes including one or more control expressions that in conjunction with the control flags define the process flow of the software application, comprising the steps of:

executing on the target computer a process flow control engine common to all information models, the process flow control engine responsive to a particular information model (i) for activating the object defined in the information model, (ii) for activating an action defined by the control flags, (iii) for instantiating attributes of the object, and (iv) for processing functions over the instantiated attributes of the object using the control flag and/or expressions such that the process flow control engine executes the particular information model directly and without generation of code normally associated with the software application.

* * * * *